Figure 1:
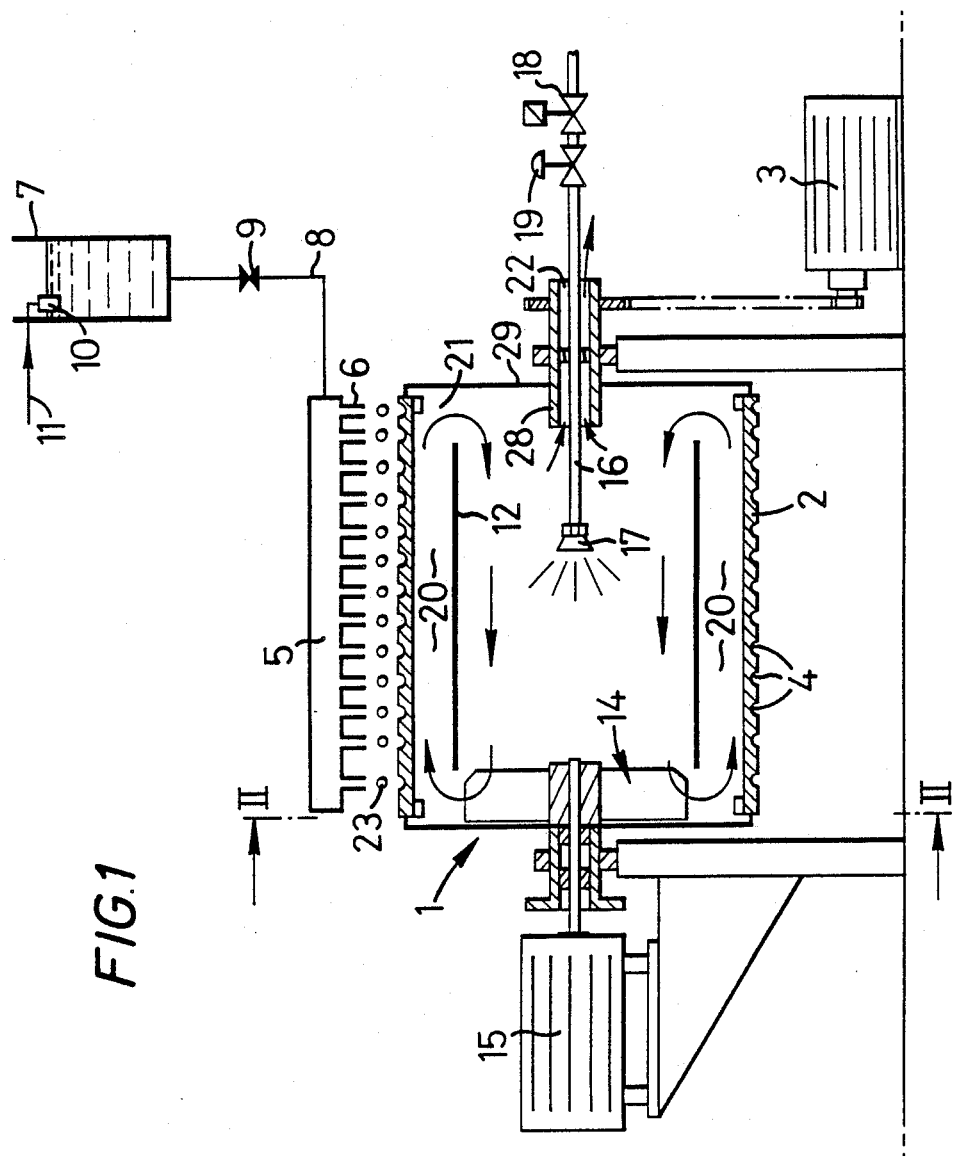

United States Patent [19]

Miller et al.

[11] Patent Number: 4,914,927
[45] Date of Patent: Apr. 10, 1990

[54] METHOD AND APPARATUS FOR FREEZING PRODUCTS

[75] Inventors: Jeremy P. Miller, Oxon; Colin D. Smith, Surrey, both of United Kingdom

[73] Assignee: Air Products and Chemicals, Inc., Allentown, Pa.

[21] Appl. No.: 301,567

[22] Filed: Jan. 25, 1989

[30] Foreign Application Priority Data

Feb. 1, 1988 [GB] United Kingdom ............... 8802142

[51] Int. Cl.⁴ .................................... F25D 25/02
[52] U.S. Cl. ................................. 62/381; 62/346
[58] Field of Search ................... 62/381, 63, 346; 165/89, 90; 426/524

[56] References Cited

U.S. PATENT DOCUMENTS

| | | | |
|---|---|---|---|
| 2,900,804 | 8/1959 | Rising | 62/346 |
| 3,152,453 | 10/1964 | Hamilton | 62/71 |
| 3,479,689 | 11/1969 | Kurzke et al. | 165/89 |
| 3,536,132 | 10/1970 | Peceraro et al. | 62/51.1 |
| 3,765,189 | 10/1973 | LeDiouron | 62/346 |
| 3,774,409 | 11/1973 | Persson et al. | 62/346 |
| 4,098,095 | 7/1978 | Roth | 62/346 |
| 4,183,298 | 1/1980 | Cappel et al. | 165/90 |
| 4,295,339 | 10/1981 | Kuraoka et al. | 62/51.1 |
| 4,304,293 | 12/1981 | Scheiwe et al. | 62/51.1 |
| 4,611,137 | 9/1986 | Sutrina | 165/89 |
| 4,798,614 | 1/1989 | Aubry et al. | 62/381 |

FOREIGN PATENT DOCUMENTS

| | | |
|---|---|---|
| 2136005 | 2/1973 | Fed. Rep. of Germany . |
| 2243463 | 4/1974 | Fed. Rep. of Germany . |
| 471358 | 5/1969 | France . |
| 2105465 | 4/1972 | France . |
| 2530004 | 1/1984 | France . |
| 116663 | 11/1926 | Switzerland . |
| 351132 | 6/1931 | United Kingdom . |
| 638427 | 6/1950 | United Kingdom . |
| 2023789 | 1/1980 | United Kingdom . |

Primary Examiner—Ronald C. Capossela
Attorney, Agent, or Firm—James C. Simmons; William F. Marsh

[57] ABSTRACT

A freezer (1) which comprises a drum (2) is characterized in that a cylinder (12) is disposed in said drum (2), and a fan (14) is provided for circulating cryogen through the space (20) between the outer surface of the cylinder (12) and the inner surface of the drum (2). The outer surface of the drum (2) is provided with a plurality of grooves (4) of parabolic cross-section. In use, droplets (23) of liquid egg are dropped on to the grooves (4) where they freeze individually. The frozen particles fall away from the drum as they approach the lowermost point of travel of the drum (2) and form an attractive granular product.

19 Claims, 2 Drawing Sheets

METHOD AND APPARATUS FOR FREEZING PRODUCTS

This invention relates to a method and an apparatus for freezing products and, more particularly but not exclusively, to a method and apparatus for freezing foodstuffs.

UK-A- No. 2 023 789 discloses a method and apparatus for freezing products in which discrete portions of scampi are fed onto the top of a rotating drum. The surface of the drum is maintained cold by a pool of liquid nitrogen in the bottom of the drum. As the scampi touch the drum the intense cold produces a crust freeze which should lightly adhere the scampi to the surface of the drum. As the drum rotates the scampi freeze throughout and fall onto a conveyor beneath the drum. The entire drum is contained in an enclosure. Liquid nitrogen is also sprayed directly onto the foodstuff to provide additional cooling and nitrogen vapour is vented to atmosphere.

The prior art apparatus has a number of disadvantages. Firstly the drum must be contained in an enclosure for safety reasons. In particular, if the drum is operated in ambient liquid air (boiling point $-183°$ C.) forms on the bottom of the drum and drops onto the conveyor. Liquid air combined with foodstuff produces a highly combustible mixture which has recently resulted in a fatal explosion at a food freezing plant.

A second disadvantage relates directly to the uncontrollable nature of the freezing. In particular, when the supply of foodstuff in the drum is stopped the surface temperature of the drum drops dramatically. This can result in such rapid crust freezing when product is subsequently placed on the top of the drum that the product does not adhere to the surface of the drum. Instead, as the drum rotates the product, with only its outer crust frozen, simply slides off the drum onto the conveyor. This problem is compensated for in the prior art by further cooling the foodstuff on the conveyor.

A third disadvantage is that the apparatus does not produce a visually attractive product when freezing the content of uncooked eggs (hereinafter called "liquid egg") or other liquid or pasty products. In particular, the egg freezes in a sheet which, unlike the scampi, does not separate freely from the drum. The sheet is removed from the drum by a scraper blade and is then ground in a further stage. Furthermore, ground product is not particularly attractive in appearance.

We have discovered that the first two disadvantages can be reduced by the correct use of a freezer which comprises a drum characterized in that a cylinder is disposed in said drum and a fan is provided for circulating cryogen through the space between the outer surface of said cylinder and the inner surface of said drum.

Advantageously, the distance between said drum and said cylinder is between 10 mm and 350 mm, more preferably between 50 mm and 150 mm, and advantageously 100 mm.

Preferably, the inner surface of said drum is provided with fins which extend, preferably radially, inwardly and are connected to said cylinder. These fins serve both to promote heat transfer to the drum and to retain the cylinder in justaposition with respect to the drum.

Advantageously, the drum and the cylinder are coaxial although this is not essential.

Preferably, the axial extent of the cylinder is less than the axial extent of the drum so that, in use, the fan may circulate cryogen through the space between the outer surface of the cylinder and the inner surface of the drum and then through the inside of the cylinder.

Advantageously, means are provided for introducing liquid nitrogen into the interior of said cylinder. Such means may be as simple as a pipe or may include a spray nozzle capable of delivering droplets less than 250 microns in diameter, preferably less than 100 microns in diameter, and more preferably less than 40 microns in diameter.

The fan may be an axial flow fan disposed in the cylinder. However, preferably, the fan is a radial flow fan positioned to draw cryogen through said cylinder and hurl it outwardly into the space between the outer surface of the cylinder and the inner surface of the drum.

The fan is preferably designed to pass cryogen along said space at a linear velocity greater than 5 m/s and preferably from 5 to 10 m/s.

Preferably, said drum is provided with an outlet which projects inwardly from an end wall of said drum and which is preferably co-axial therewith. By so positioning the outlet any droplets of cryogenic liquid entrained in the cryogen will tend to be recirculated through the cylinder rather than pass directly through the outlet.

Advantageously, the outlet is disposed circumjacent the means for introducing liquid cryogen into the interior of said cylinder.

Preferably, means are provided for controlling the flow of cryogen to said freezer so that, while said freezer is awaiting product cryogen leaves said freezer at between $-30°$ C. and $-40°$ C., and while said freezer is freezing product the cryogen leaves said freezer at less than $-40°$ C.

The present invention also provides a method for freezing products, which method comprises the steps of applying said product to the outside of a cold rotating drum, characterized in that said cold rotating drum forms part of a freezer in accordance with the invention.

Preferably, liquid cryogen is introduced into said drum at a rate such that the surface temperature of said drum immediately upstream of said product is less than $-30°$ C., preferably less than $-35°$ C., and more preferably less than $-38°$ C.

Advantageously, the cold cryogen exhausted from said drum is at a temperature between $-40°$ C. and $-160°$ C., preferably between $-40°$ C. and $-120°$ C., and advantageously at $-100°$ C. whilst product is being frozen.

It will be appreciated that the temperature of the cryogen passing through the space is only marginally colder than the cold cryogen leaving the drum through the outlet. Using the preferred exhaust temperatures it will be appreciated that the liquid air (boiling point $-183°$ C.) will not form on the outside of the drum thereby overcoming one of the disadvantages of the prior art.

Preferably the fan circulates cryogen through the space between the outside of the cylinder and the inside of the drum at a linear velocity greater than 5 m/s and preferably from 5-10 m/s. At this velocity cooling of the drum can be very accurately controlled. Typically, the cryogen is liquid nitrogen and this is introduced at a rate such that cooling of the outer surface of said drum is achieved at a rate of from 100 to 140 w/m$^2°$ C.

Preferably, the flow of cryogen is controlled so that the exhaust temperature is between −30° C. and −40° C. when no product is being supplied to the drum and less than −40° C. when product is being frozen on said drum.

The freezer thus far described is suitable for freezing most products and is particularly, but not exclusively, suitable for freezing foodstuffs.

Turning now to the third disadvantage, the prior art has produced sheets of frozen liquid or pasty products which have subsequently been comminuted to produce a granular product. These sheets have adhered fast to the outside of the drum and scrapers have been necessary to prise them from the drum.

The present invention provides a freezer for freezing liquid and pasty products, said freezer having a drum mounted for rotation about a generally horizontal axis, characterized in that said freezer is provided with means for applying droplets of said product onto the outer surface of said drum, and said drum is provided with means to inhibit said droplets coalescing.

Preferably, said means comprises one or more grooves extending around the periphery of said drum. The means might also comprise a plurality of dimples in the outer surface of the drum.

By inhibiting the droplets coalescing the product freezes as individual granules which, unlike the sheets of the prior art, do not adhere strongly to the outer surface of the drum.

Advantageously, the grooves are of generally parabolic cross-section although they could also be, for example, of rectangular or semi-circle cross-section.

Although not essential, it is particularly preferred to provide the freezer with some or all of the features hereinbefore described.

The present invention also provides a method of freezing liquid and pasty products, which method comprises the steps of applying said product to a cold surface of a drum, freezing said product and removing frozen product from said cold surface, characterized in that said product is applied to said surface in the form of droplets, and said drum is provided with means to inhibit said droplets coalescing.

Preferably, said droplets have a mean volume of from 0.02 to 0.2 cc and, more preferably, from 0.03 to 0.08 cc.

Preferably, said droplets are applied at a rate such that at least 90% and preferably at least 98% of the droplets of product freeze as individual granules.

Advantageously, the product is cooled to an average temperature of less than −17° C., preferably less than −25° C., and more preferably less than −38° C. before parting from said cold surface.

Preferably, the temperature 1 mm beneath said cold surface does not become warmer than −20° C. whilst said product is in contact therewith. More preferably, said temperature does not become warmer than −25° C. whilst said product is in contact therewith.

The temperature below the cold surface can conveniently be measured by a thermocouple.

Examples of liquid and pasty products are liquid egg, cream, sauce, gravy, chopped spinach, pharmaceutical products and blood products.

Figure 2:
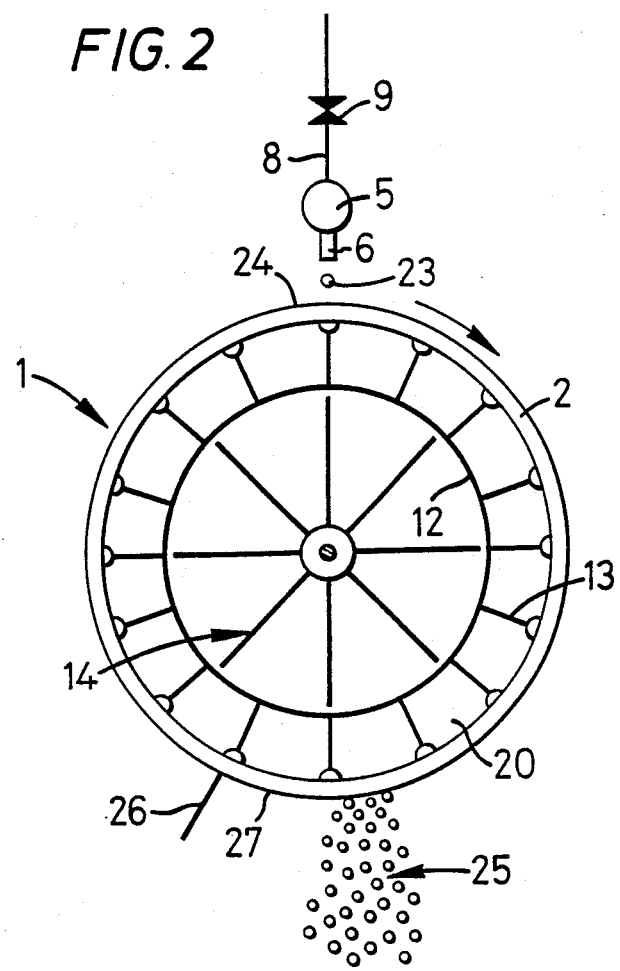

For a better understanding of the present invention reference will now be made, by way of example, to the accompanying drawing, in which:

FIG. 1 is a simplified vertical cross-section through one embodiment of a freezer in accordance with the present invention; and FIG. 2 is a section taken on line II—II of FIG. 1.

Referring to the drawings there is shown a freezer which is generally identified by the reference numeral 1.

The freezer 1 comprises a drum 2 which can be rotated about its longitudinal axis at a speed variable from 0-4 r.p.m. by a motor 3. The drum 2 is made of stainless steel and has an outer diameter of 600 mm and a maximum wall thickness of 5 mm.

The drum 2 is provided with a multiplicity of grooves 4 which extend around the periphery of the drum 2. Each groove 4 is of substantially parabolic cross-section and has a focal length of about 0.6 mm.

The outer surface of the drum is highly polished.

A droplet dispenser 5 is connected to a tank 7 by a pipe 8 which is provided with a valve 9. The tank 7 is provided with a float valve 10 which is connected to an inlet pipe 11.

The drum 2 contains an inner cylinder 12 which is also made from stainless steel and which is connected to the drum 2 by sixteen fins 13 which extend radially inwardly from the drum 2. The radially outer surface of the inner cylinder 12 is separated from the radially inner surface of the drum 2 by a space 20 of approximately 100 mm.

A radial fan 14 is mounted for rotation in the drum 2 and is connected to a motor 15 which, in our prototype apparatus was a 2.2 kW (3 H.P.) variable speed motor.

A pipe 16 having a spray nozzle 17 extends into the inner cylinder 12 and is connected to a source of liquid nitrogen (not shown) via a control valve 18 and a shut off valve 19.

In use, motor 15 is started and adjusted so that the radial fan 14 runs at approximately 1400 r.p.m. The radial fan 14 circulates air through the space 20 at a linear velocity of approximately 5 m/s.

Shut off valve 19 and control valve 18 are then opened to admit liquid nitrogen through the pipe 16 and spray nozzle 17 into the inner cylinder 12. The droplets of liquid nitrogen, which are less than 40 microns in diameter, together with nitrogen vapour, are drawn along the inner cylinder 12 then hurled radially outwardly by radial fan 14. They then travel along the space 20 until they reach area 21 bounded by an end wall 29. Some of the vapour is recirculated whilst the balance is exhausted through passageway 22 circumjacent the pipe 16. The entrance to the passageway 22 is defined by an outlet 28 which projects inwardly from the end wall 29 of the drum 2. The outlet 28 deflects unevaporated droplets of liquid nitrogen and facilitates their recirculation to the intake of the radial fan 14.

The flow of liquid nitrogen is controlled by control valve 18 in a manner such that the temperature of the exhaust gas is kept substantially constant at −38° C. when valve 9 is closed.

Once the exhaust gas has reached the substantially constant temperature desired (−38° C.) motor 3 is actuated to rotate drum 2 at approximately 2 r.p.m. Valve 9 is then opened to admit liquid egg from tank 7 through pipe 8 into droplet dispenser 5. Simultaneously valve 19 is controlled to reduce the temperature of the exhaust gas to −100° C. The droplet dispenser 5, which is shown in simplified form, is designed so that each outlet tube 6 dispenses droplets containing approximately 0.05 cc of liquid egg. The rate at which the droplets can be dispensed can be varied but we have found a dispensing rate of 600 droplets per minute per outlet quite satisfactory.

The droplets 23 drop into the grooves 4 and almost immediately the surface of the droplets solidifies because of the cold of the drum 2. The cooling occurs so rapidly that there is little tendency for the liquid egg to run down along the groove 4 and consequently the droplets form individual granules which do not coalesce with one another.

As the drum rotates the granules freeze throughout and then become progressively colder. As they approach their lowestmost point the majority of the granules simply fall off leaving a pile of a most attractive granular product 25.

A light duty scraper 26 is provided to dislodge any granules which do not fall of their own accord.

At equilibrium the temperature of the surface of the drum 2 at position 24 is approximately −39° C. Similarly the temperature at the surface of the drum 2 at position 27 is approximately −32° C.

It is significant to note that when the temperature of the exhaust gas was adjusted up to −80° C. the frozen granules stuck fast to the surface of the drum 2 and had to be forcibly removed. This corresponded to a surface temperature of −27° C. at position 24 and −20° C. at position 27. In contrast it was observed that if the surface temperature at position 24 was lowered below −43° C. the particles did not adhere to the surface of the drum 2 and simply slid off before having frozen through.

Unlike the outer surface of drum 2, the inner surface is roughened to promote turbulent heat transfer with the cold nitrogen passing through the space 20. Similarly, the surfaces of the inner cylinder 12 and the fins 13 may be similarly roughened.

In our experimental runs we have prepared granular egg using 2 kg of liquid nitrogen for every 1 kg of product. This compares with 5 kg of liquid nitrogen to every 1 kg of product in one well known process in which droplets of liquid egg are simply dropped into a trough of liquid nitrogen.

Whilst the prepared embodiment has been described with particular reference to the freezing of liquid egg it will be appreciated that other liquid or pasty products could be frozen in a similar manner. Amongst these are scrambled egg mixture, separated yolks, separated whites, cream, sauces and gravy. Pharmaceutical products are also amenable to such freezing as are blood products.

The size of the granules can be adjusted by altering the size of the droplets 23 and/or the size and/or profile of the grooves 4.

If desired, for the purpose of freezing liquid and past products, the drum 2 may be cooled by a different arrangement, for example the radial fan 14, the inner cylinder 12 and the fins 13 may be dispensed with and a liquid cryogen simply sprayed against the inside of the drum, preferably from a spray bar extending along the drum and disposed adjacent the wall. Alternatively, the radial fan 14, the inner cylinder 12 and the fins 13 may be dispensed with and the lower part of the drum filled with a liquid cryogen. In a further embodiment, the radial fan 14 is retained but the inner cylinder 12 and the fins 13 omitted.

In any of the above described arrangements at least part of the cryogen leaving the drum may be sprayed directly on to the product being frozen.

What is claimed is:

1. A freezer which comprises a drum, characterized in that a cylinder is disposed in said drum, and a fan is provided for circulating cryogen through the space between the outer surface of said cylinder and the inner surface of said drum, said freezer including means to inject and vent cryogen into and from said drum.

2. A freezer as claimed in claim 1, characterized in that said drum is provided with fins which extend inwardly and which are connected to said cylinder.

3. A freezer as claimed in claim 1, characterized in that the axial extent of said cylinder is less then the axial extent of said drum.

4. A freezer as claimed in claim 1, characterized in that means are provided for introducing liquid cryogen into the interior of said cylinder.

5. A freezer as claimed in claim 4, characterized in that said means comprise a spray nozzle.

6. A freezer as claimed in claim 5, characterized in that said spray nozzle is designed to deliver droplets of cryogen with a diameter less than 40 microns.

7. A freezer as claimed in claim 1, characterized in that said fan is a radial flow fan positioned to draw cryogen through said cylinder and hurl it outwardly into the space between the outer surface of the cylinder and the inner surface of the drum.

8. A freezer as claimed in claim 1, characterized in that said fan is designed to pass cryogen along said space at a velocity greater than 5 m/s.

9. A freezer as claimed in claim 8, characterized in that said fan is designed to pass cryogen along said space at a velocity from 5 to 10 m/s.

10. A freezer as claimed in claim 1, characterized in that said drum is provided with an outlet which projects inwardly from an end wall of said drum.

11. A freezer as claimed in claim 10, wherein said outlet is coaxial with said drum.

12. A freezer as claimed in claim 1, including means for controlling the flow of cryogen to said freezer so that, while said freezer is awaiting product, cryogen leaves said freezer at between −30° C. and −40° C., and while said freezer is freezing product the cryogen leaves said freezer at less than −40° C.

13. A freezer which comprises a drum, characterized in that a cylinder is disposed in said drum, a fan is provided for circulating cryogen through the space between the outer surface of said cylinder and the inner surface of said drum, means are provided for introducing liquid cryogen into the interior of said cylinder, said drum is provided with an outlet which projects inwardly from an end wall of said drum, said outlet is coaxial with said drum, and said outlet is disposed circumjacent said means for introducing liquid cryogen into the interior of said drum.

14. A freezer as claimed in claim 13, characterized in that said means comprise a spray nozzle.

15. A freezer as claimed in claim 14, characterized in that said spray nozzle is designed to deliver droplets of cryogen with a diameter less than 40 microns.

16. A freezer as claimed in claim 13, characterized in that said fan is a radial flow fan positioned to draw cryogen through said cylinder and hurl it outwardly into the space between the outer surface of the cylinder and the inner surface of the drum.

17. A freezer as claimed in claim 13, characterized in that said fan is designed to pass cryogen along said space at a velocity greater than 5 m/s.

18. A freezer as claimed in claim 17, characterized in that said fan is designed to pass cryogen along said space at a velocity from 5 to 10 m/s.

19. A freezer as claimed in claim 13, including means for controlling the flow of cryogen to said freezer so that, while said freezer is awaiting product, cryogen leaves said freezer at between −30° C., and −40° C., and while said freezer is freezing product the cryogen leaves said freezer at less than −40° C.

* * * * *